Sept. 11, 1956 A. E. WIDMER ET AL 2,762,770
CATAPHORETIC SEPARATION OF IMPURITIES FROM LIQUIDS
Filed March 14, 1951 3 Sheets-Sheet 2

INVENTORS
Eugene W. Greenfield
Alfred Emil Widmer
BY
ATTORNEYS

Sept. 11, 1956 A. E. WIDMER ET AL 2,762,770
CATAPHORETIC SEPARATION OF IMPURITIES FROM LIQUIDS
Filed March 14, 1951 3 Sheets-Sheet 3

INVENTORS
Eugene W. Greenfield
Alfred Emil Widmer
BY
ATTORNEYS

United States Patent Office 2,762,770
Patented Sept. 11, 1956

2,762,770

CATAPHORETIC SEPARATION OF IMPURITIES FROM LIQUIDS

Alfred Emil Widmer, Ossining, N. Y., and Eugene Willis Greenfield, Granville, Ohio, assignors to Anaconda Wire and Cable Company, a corporation of Delaware Application March 14, 1951, Serial No. 215,424

8 Claims. (Cl. 204—180)

This invention relates to the cataphoretic (electrophoretic) separation of colloidal impurities from liquid media, and provides a method for effecting such separation by successively subjecting the media first to an electric current at a relatively high current density then to an electric current at a relatively low current density. The invention also provides a unique electrolytic tank and electrode structure and arrangement in which the method of the invention is carried out. A settling tank of new design having semi-cylindrical baffles is employed to allow the particles coagulated in the electrolytic tank to settle in the shortest possible time.

Various industrial operations entail the production of large quantities of waste water bearing metallic impurities. It is undesirable to pollute streams with such industrial waste since it is injurious to fish and plant life and to drinking water supplies. Furthermore, such waste water often contains worthwhile quantities of metal which it is desirable to recover, and the recovery of the water itself in purified form is in many cases well worth while. For example, in copper rod mills, copper wirebars are heated to a glowing temperature and then passed through a succession of rolls to reduce their diameter until finally copper rods suitable for drawing into wire are produced. Each set of rolls must be cooled by water, and the copper rods finally produced are quenched in a water bath. The water utilized for these purposes picks up considerable quantities of copper oxide scale and other impurities which are colloidally dispersed throughout the water. Not only is the metal content of the used water valuable if it can be recovered at an economically feasible cost, but the water after purifying can be recirculated and reused. The considerable expense of pumping and filtering water from a stream source, or of purchasing water from a municipality, can be reduced to a minimum by recirculation of purified cooling water. Such conservation of water is especially important in view of the constantly increasing industrial and municipal demand for water.

The present invention meets the above needs. It achieves the continuous purification of various industrial waste waters, such, for example, as used cooling water from copper rod mills, quickly and inexpensively enough to allow recycling, and results at the same time in the recovery of the metal values of the waste water.

The process of this invention comprises establishing first and second bodies of the liquid to be treated. The liquid is treated in the first body by passing through it an electric current at a relatively high current density; and then, after transferring the so-treated liquid to the second body, it is further treated by passing through it an electric current at a relatively lower current density. It has been found to be best to cause the liquid medium being treated to flow rapidly through the first body, remaining therein only several minutes, and after passing into the second body to remain therein slowly eddying about for some hours. This can be achieved by making the first body, into which the medium is initially introduced for treatment, of small volume, and making the second body of considerably larger volume.

The dispersed particles are caused by the electrical current to migrate towards one pole or the other according to the nature of the electrical charge upon them. In the course of this movement or cataphoresis (electrophoresis) the individual particles aggregate, and eventually the clumps settle out of the liquid medium when it is quiescent. Treatment of the impure aqueous medium initially at the relatively high current density has been found to assure particularly rapid and effective cataphoretic aggregation of the colloidal solids when the medium thereafter is subjected to treatment at the relatively low current density.

The passage of air (or any oxygen-containing gas) through the liquid while it is in the electrolytic treating tank accelerates the cataphoretic aggregation of the individual particles.

In the apparatus of the invention an electrolytic treating tank is provided with one or more cylindrical anodes in which a cathode element is coaxially arranged. Advantageously a pipe extends coaxially through each cylinder and serves both as a cathode and as a means of introducing the medium to be treated into the interior of each cylinder. Each cylindrical anode is open at one end so that the liquid medium may flow down through the cylinder, and therein it is subjected to the influence of an electric current at a relatively high current density. The liquid then flows out into the electrolytic tank, outside the cylinder, where it is subjected to the action of an electric current at a relatively low current density. The wall of the tank acts as a cathode, and additional cathodes may be placed about the interior of the tank to obtain a more uniform current distribution throughout the body of liquid in the tank.

Anode rods of a different metal than the metal used for construction of the anode cylinders advantageously may be hung from a bus ring atop each cylinder so as to extend down alongside the outer and inner surfaces of the cylinder wall. These serve to increase the efficiency of the anode structure. An ordinary motor-generator set is employed to furnish current to the electrolytic tank and to establish a positive electrical charge on the anode cylinder and rods in relation to the cathode elements.

A settling tank is provided to receive the treated water from the electrolytic tank. Two semi-cylindrical baffles, the inner one of which has an opening at its bottom, are placed concentrically before each liquid intake to the settling tank to reduce the velocity and minimize turbulence of the liquid, and thereby allow rapid settlement of aggregated clumps.

Automatic clean-out means such as a screw conveyor may be mounted in a trench in the bottoms of the electrolytic and settlement tanks, or a continuous belt scoop conveyor may if desired be provided, to remove the sludge from the bottoms of the tanks at periodic intervals.

An advantageous embodiment of the invention is described below, with reference to the accompanying drawings, in which Fig. 1 is a plan of the new electrolytic tank and settling tank combination;

Figure 1:
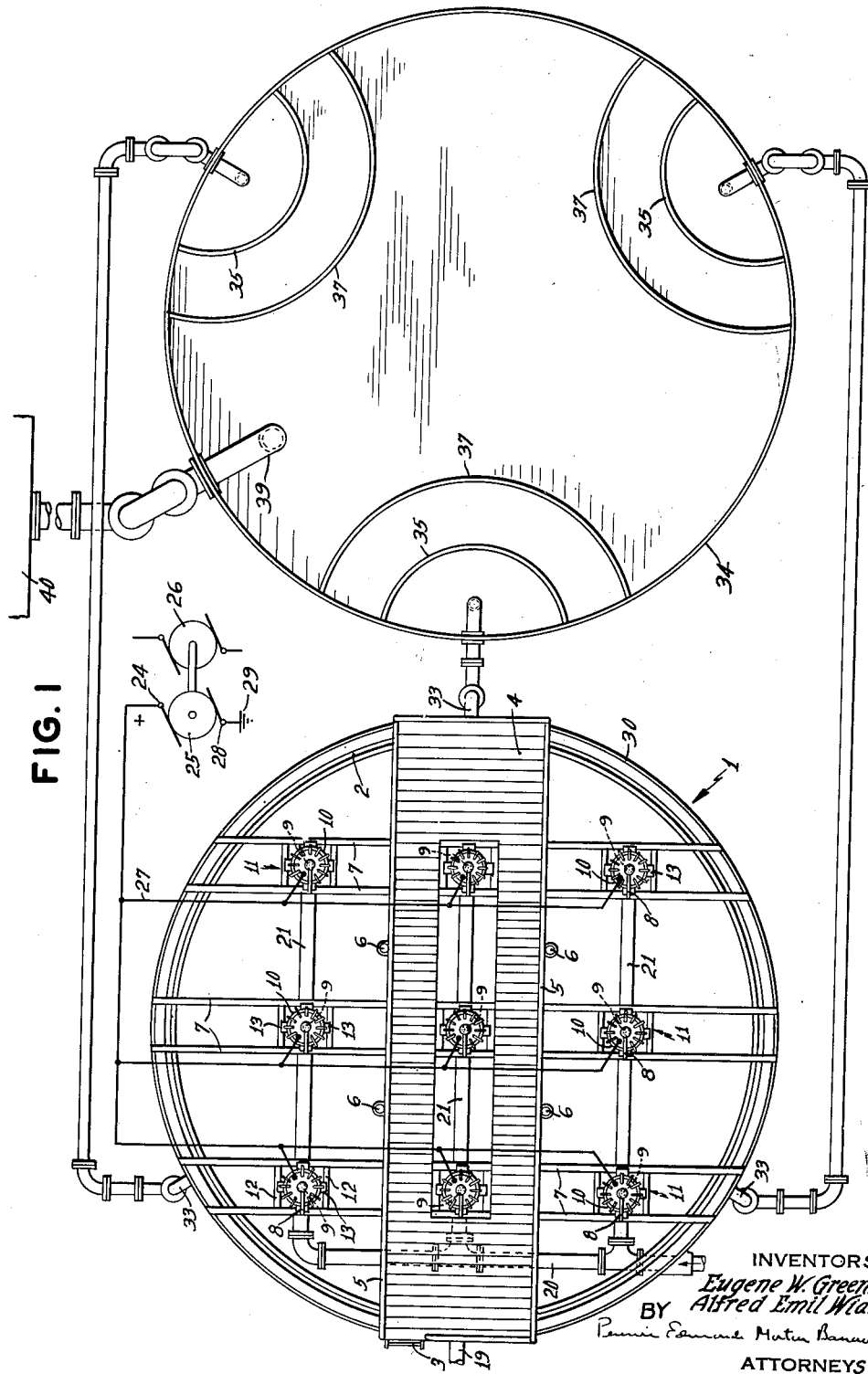
Figure 2:
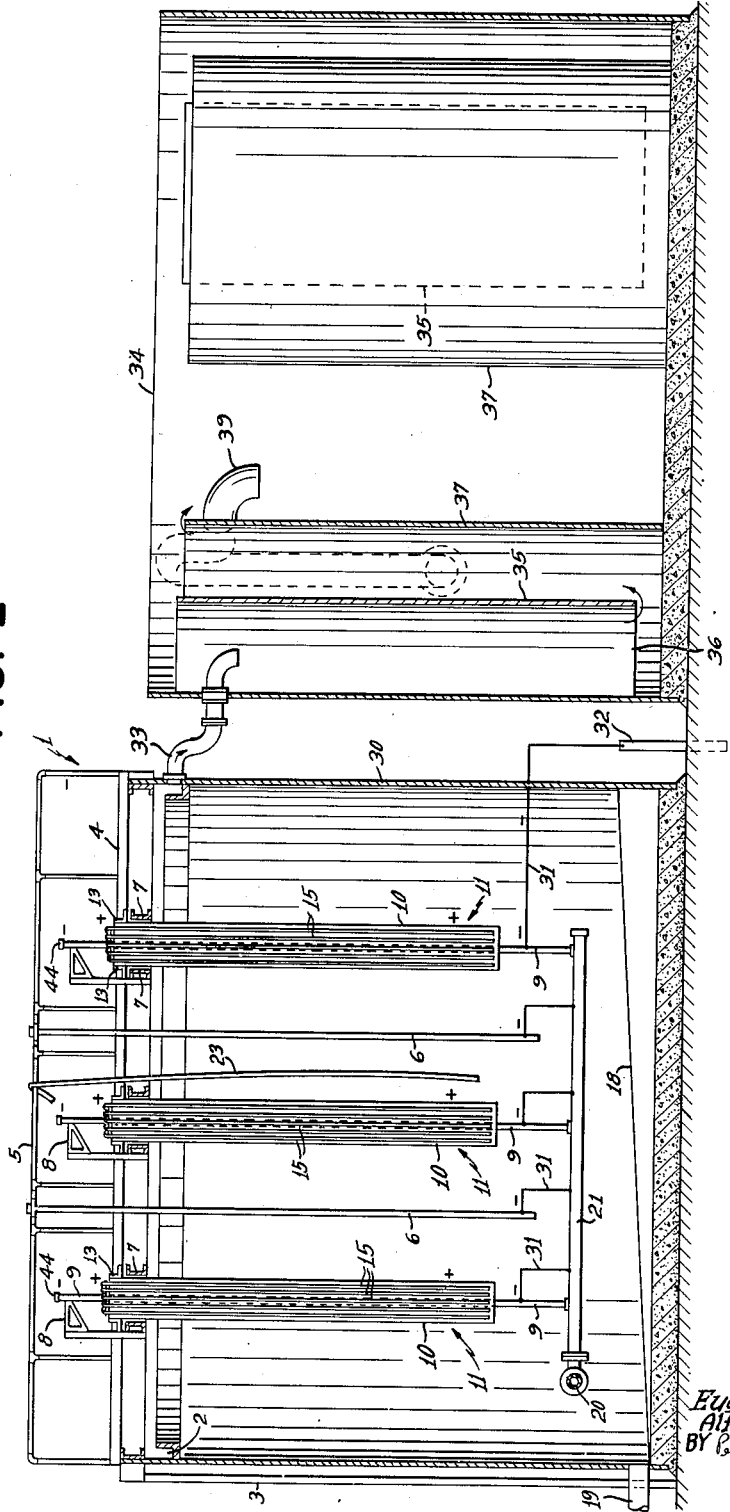
Fig. 2 is a longitudinal section through the electrolytic and settling tanks of Fig. 1, showing in elevation the electrode structure.

The apparatus shown in Figs. 1 and 2 comprises an electrolytic tank 1 with an overflow trough 2 extending about the interior of the tank rim at the liquid level. A ladder 3 and board catwalk 4 and railings 5 provide a working platform atop the electrolytic tank, and serve also to support four cathodes 6 (advantageously of piping). Girders 7 span the top of the tank 1 to support the catwalk 4, and carry one or more triangular cathode supporting brackets 8 (nine such brackets are shown in Fig. 1). These brackets in turn support nine central feed and cathode pipes 9 which extend down through nine anode cylinders 10. Each anode cylinder with its coaxial cathode pipe constitutes an electrode assembly 11 extending down into tank 1. The anode cylinders 10 are open at both ends and are supported from the girders 7 by cross-members 12 and by insulated brackets 13. Anode rods 14 and 15 (Figs. 3 and 4), which are formed with hooks at their upper ends, are hung on anode bus rings 16 secured to and in electrical contact with the upper ends of the anode cylinders 10. These rods extend down adjacent to the inside and outside walls of the anode cylinders 10. The bus rings 16 extend around the interior of each anode cylinder at its upper rim and protrude above the rim of each cylinder.

As shown in Figs. 1 and 2, the concrete base and bottom 18 of the tank 1 is sloped towards a drain-off 19. A header pipe 20 supplies the water (or other medium) to be treated, such as used copper rod mill cooling water, to three feeder pipes 21 located in the lower portion of tank 1 and which in turn are connected to the lower ends of the central feed and cathode pipes 9. The water enters the anode cylinders through openings 22 (Fig. 3) in the pipes 9 at a point just below the normal liquid level (which is determined by the location of the overflow trough 2).

A hose 23 or equivalent conduit is advantageously provided to bubble air through the water in the treatment tank 1.

The positive terminal 24 of a D. C. generator 25 driven by a motor 26 is electrically connected by wires 27 to the anode bus rings 16. The negative terminal 28 of generator 25 is solidly grounded as indicated at 29. The electrolytic tank wall 30 and all the supporting structure including the railing 5 and girders 7, as well as the feeder and cathode pipes 21 and 9 and the additional cathodes 6, are firmly connected electrically to each other, advantageously by bonding wires 31, and the entire structure is electrically connected to ground by a ground rod 32.

As best shown in Fig. 1, three overflow pipes 33 lead from the overflow trough 2 of the electrolytic tank 1 at equally spaced intervals about its periphery to a settling tank 34. Inner baffle plates 35 surrounding the three intakes to the settling tank (to which the three overflow pipes 33 are respectively connected) terminate short of the bottom of this tank and direct the flow of liquid down to openings 36 between the lower end of the baffles and the bottom of the tank. Outer baffle plates 37 enclosing but spaced from the inner baffles 35 and extending to the bottom of the settling tank then direct the flow of liquid up and over their upper lips into the interior of the settling tank 34. The settling tank is provided with a drainpipe 39 located far enough below the surface of the liquid to prevent any scum from being carried over with the clarified treated water. Such water flows from the settling tank through the drainpipe to a sump 40 from which it can be pumped back to the rod-mill rolls and quenching baths, or to other point of use.

Figure 3:
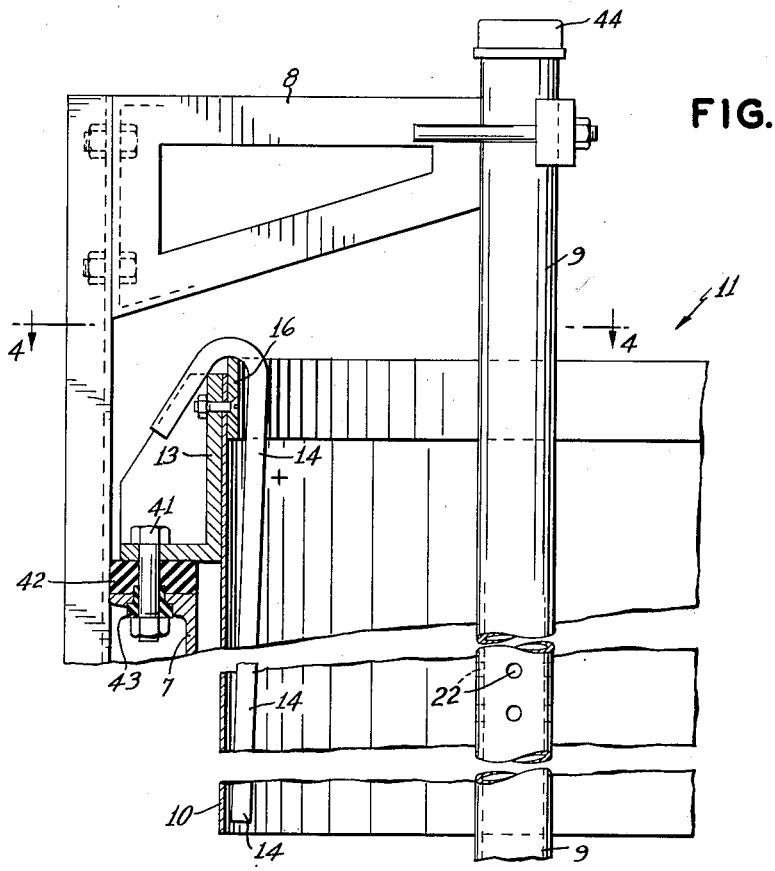
Fig. 3 is a vertical section on an enlarged scale through the coaxial electrode structure.

The construction of the coaxial electrode assembly 11 will be better understood from a consideration of Fig. 3. As there shown, the triangular bracket 8 has the central feed and cathode pipe 9 clamped to it. The brackets 13, which support the cylindrical anode 10, are fastened by bolts 41 to the girders 7 and are insulated from the girders by insulating washers and bushings 42 and 43 respectively. The anode rods 14 are hung on the bus ring 16 by their hooked upper ends and extend to the bottom of the anode cylinder 10. The openings 22 (eight are indicated in the drawings) in the central feed and cathode pipe 9 are located at a point just below the normal liquid level (determined by the position of the overflow trough 2, shown in Figs. 1 and 2). The top of the central feed and cathode pipe 9 is closed by a cap 44.

Figure 4:
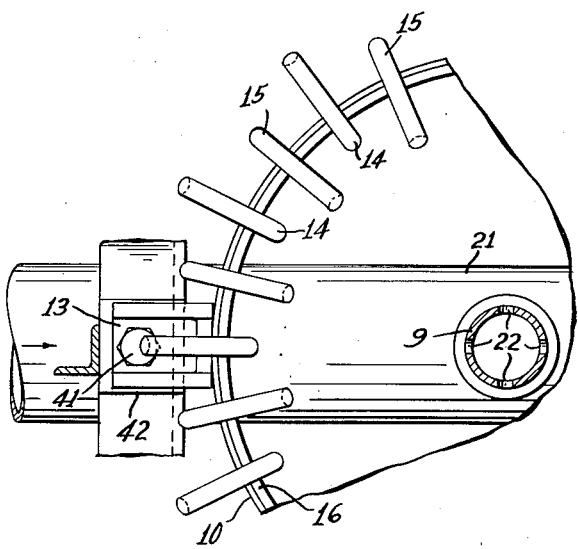
Fig. 4 is a view taken substantially along the line 4—4 of Fig. 3.

Referring to Fig. 4, which gives an overhead view of the coaxial electrode structure taken substantially on line 4—4 of Fig. 3, the anode rods 14 and 15 are shown to extend both inside and outside the anode cylinder 10 and to be hung around the entire circumference of the bus ring 16.

In carrying out the method of the invention in the apparatus described above, the waste water from the rod-mill rolls and quenching pits, or other source, is pumped into the apparatus through the header pipe 30. It is distributed through the feeder pipes 21 to each of the central feed and cathode pipes 9 and flows up through these pipes and out the openings 22 into the interior of the cylindrical anode 10 adjacent its upper end. The water then flows quite rapidly down through the cylinder 10 and out its open lower end into the tank 1. While flowing down through the interior of the anode cylinder the liquid is subjected to an electric current at a relatively high current density, and after entering the tank outside the cylindrical anode it is subjected to an electrical current at a relatively low current density.

In an actual installation constructed as described above, the current distribution was found to be as follows: about 53% was distributed within the coaxial structure between the anode cylinder 10 with its inside rods 14 and the central feed and cathode pipe 9; about 38% was distributed between the anode cylinder 10 with its outside anode rods 15 and the vertical walls 30 of the electrolytic tank; and about 9% was distributed between the anode structure and the bottom of tank 1.

The current density within the coaxial electrodes 11 may range from 0.1 ampere per square inch to 0.003 ampere per square inch; and outside the coaxial electrodes 11, between such electrodes and the tank wall 30, it may range from 0.05 ampere per square inch to 0.0001 ampere per square inch. The voltages required to produce these current densities depend on the dimensions of the apparatus and the conductivity of the water being treated, but in a typical case they range from 65 to 45 volts. Supplying about 250 amperes at about 55 volts to a 60,000 gallon electrolytic treating tank constructed as described above, it has been found possible to treat sixty gallons of water per minute. At the more conservative treatment rate of forty gallons per minute, the water may remain in the high current density body for, say, about four minutes, and in the low current density body for, say, about five hours. The treatment time of a typical copper rod mill waste water was found to vary inversely as a power of about 1.2 of the average current density in the water.

While a large part of the coagulated impurities settles out in the electrolytic tank, a small portion remains suspended in the water and is carried over into the settling tank. The treated water flows slowly from the lower open ends of the anode cylinders 10, eddying about in the tank, up to the overflow trough 2 and out through the overflow pipes 33 to the settling tank. Then it passes down between the tank wall and the inner baffles 35, and thence it flows through the openings 36 and up between the inner baffle 35 and the outer baffle 37 and over the baffle lip 38. The purified treated water is drawn off from the settling tank by the drainpipe 39 at a point well below the surface (to avoid picking up floating scum) and flows to the sump 40 to be recirculated to the point of use.

In the treatment of copper-bearing waste water, the most practical metals to use in construction of the electrodes are ordinary low carbon steel for the cathodes 6, 9, 21, 30, etc., copper for the anode rods 14 and 15, and any industrial grade of stainless steel for the anode cylinders 10. This combination of metals has been found to give the best electrode efficiency. It is generally preferable to use for the anode cylinders a metal that will resist corrosion in the electrolytic tank, and then to add to it the anode rods of whatever different metal gives the maximum anode efficiency. For example, while stainless steel is quite satisfactory as an anode in the treatment of copper-bearing rod-mill water, and is resistant to anode corrosion during electrophoresis of such water, its efficiency as an electrode metal is lower than that of copper, and therefore the anode rods 14 and 15 are of copper to increase such efficiency. Any industrial grade of ordinary low carbon steel gives good cathode efficiency and so is a satisfactory material from which to construct the electrolytic tank 1 and the cathode pipes 9 and 6. A slight amount of copper is deposited on the interior of the electrolytic tank walls and aids in preventing corrosion.

The major part of the coagulation and settling of the dispersed colloidal particles takes place while the rod-mill water is slowly eddying about outside the coaxial electrodes and while being treated there at the relatively low electrical current density. The water that overflows from this body of liquid may become as clear as drinking water when allowed a very short settling time. In actual operation the pH of the soft, purified water that is drawn off from the settling tank is generally approximately 7.

In one trial run of the new apparatus in purifying copper rod-mill water, the deep red, untreated dirty water intake, when subjected to light absorption tests, transmitted only 27% of the incident light, but after treatment the effluent from the settling tank transmitted 90% to 99% of the incident light and had a colorless appearance. The copper content (on a dry weight basis) of the sludge recovered from the bottom of the electrolytic and settling tanks was found in these trials to vary from 67% to 75%. More than two tons of dried sludge was recovered from 1,700,000 gallons of rod-mill waste water treated in one month. The copper anode rods 14 and 15 showed less than 1% loss in a month of continuous operation.

The passage of air, and this term includes any gas or gas mixture containing oxygen, through the body of liquid in the treatment tank outside the coaxial electrodes 14 in the electrolytic tank 1, has been found generally effective for decreasing the treating time required to produce clear water from industrial waste water by 15% to 25%, and so permits more rapid operation and lower power consumption. For this reason the bubbling of air through the water in the treatment tank (it is introduced, for example, through the hose 23) is generally desirable.

The new method of purification of water and recovery of dispersed particles results in virtually complete elimination of colloidal impurities from the treated water. It is well adapted to continuous operation and so can be operated easily and economically where it is desired to treat large quantities of waste liquors bearing colloidally dispersed particles. The water can be reused, and stream pollution is avoided.

The new apparatus is simple and economical in its operation, requiring little labor and having minimum power consumption. It is of sturdy construction and requires little maintenance attention.

We claim:

1. The method of separating colloidal impurities including metallic compounds from an aqueous medium which comprises establishing first and second bodies of such liquid medium, treating liquid in said first body by passing through it, between a first set of electrodes, direct electrical current at a current density of from about 0.1 ampere per square inch to 0.003 ampere per square inch, transferring so treated liquid medium from the first to the second of said bodies, and further treating such liquid in said second body by passing through it, between the second set of electrodes, direct electrical current at a current density of from about 0.05 ampere per square inch to 0.0001 ampere per square inch, thereby causing said impurities to aggregate.

2. The method of separating colloidal impurities from an aqueous medium as set forth in claim 1 in which the aqueous medium is treated with the electrical current in the second body for a period of time relatively longer than the aqueous medium is treated with the electrical current in the first body.

3. The method of separating colloidal impurities from an aqueous medium as set forth in claim 2 in which the aqueous medium is treated with the electrical current in the first body for a period of several minutes and is treated with the electrical current in the second body for a period of several hours.

4. The method of separating colloidal impurities from an aqueous medium as set forth in claim 1 in which air is passed through at least one of the bodies of aqueous medium during the treatment of it with the electrical current.

5. The method of separating colloidal impurities including metallic compounds from an aqueous medium which comprises passing through such medium, between a first set of electrodes, direct electrical current at a current density of from about 0.01 ampere per square inch to 0.003 ampere per square inch, then passing through such medium, between a second set of electrodes, direct electrical current at a current density of from about 0.05 ampere per square inch to 0.0001 ampere per square inch, thereby causing said impurities to aggregate.

6. The method of separating colloidal impurities from an aqueous medium as set forth in claim 5 in which the colloidal impurities include cupreous impurities.

7. The method of separating colloidal impurities including metallic compounds from an aqueous medium as set forth in claim 5 in which the aqueous medium is treated with electrical current between the second set of electrodes for a relatively longer period than it is treated between the first set of electrodes.

8. The method of separating colloidal impurities including metallic compounds from an aqueous medium as set forth in claim 5 in which a gas-containing oxygen is passed through the aqueous medium while it is being treated with the electrical current between the first set of electrodes.

References Cited in the file of this patent

UNITED STATES PATENTS

| 470,181 | Collins | Mar. 8, 1892 |
| 1,069,169 | Parker | Aug. 5, 1913 |
| 1,392,524 | Puiggari et al. | Oct. 4, 1921 |
| 1,609,546 | Harris | Dec. 7, 1926 |
| 2,456,897 | Smiley et al. | Dec. 21, 1948 |
| 2,571,247 | Huebotter | Oct. 16, 1951 |

FOREIGN PATENTS

| 2,762 | Great Britain | Feb. 24, 1888 |
| 626,518 | Germany | Feb. 27, 1936 |